March 26, 1963 A. G. NERHEIM 3,082,618
METHOD FOR DETERMINING THE MOLECULAR WEIGHT OF GASES
Filed Oct. 9, 1959 2 Sheets-Sheet 1

INVENTOR.
Arvie Glenn Nerheim
BY
ATTORNEY

March 26, 1963  A. G. NERHEIM  3,082,618
METHOD FOR DETERMINING THE MOLECULAR WEIGHT OF GASES
Filed Oct. 9, 1959  2 Sheets-Sheet 2

INVENTOR.
Arvie Glenn Nerheim
BY
ATTORNEY

United States Patent Office 3,082,618
Patented Mar. 26, 1963

3,082,618
METHOD FOR DETERMINING THE MOLECULAR WEIGHT OF GASES
Arvie Glenn Nerheim, Crown Point, Ind., assignor to Standard Oil Company, Chicago, Ill., a corporation of Indiana
Filed Oct. 9, 1959, Ser. No. 845,497
1 Claim. (Cl. 73—30)

The invention relates to a method for determining the molecular weight of gases. More particularly, the invention relates to a method for continuously measuring gas and vapor molecular weights.

In many process monitoring and process control applications it is necessary to continuously determine the molecular weight of a gas stream. Since a comparatively small variation in molecular weight may often reflect a major process change, it is essential that the detectors for measuring such variations be exceedingly sensitive and accurate. At the same time, however, it is required that the detectors be simple, rugged, and relatively free from base line drift. These criteria, tho seemingly inconsistent, take on even more significance when molecular weight detectors are employed as closed-loop process control devices.

A primary object of the invention is to provide a system for determining the molecular weight of a gas stream, which system is continuous in operation, extremely sensitive and accurate, and also simple and rugged. Another object is to provide such a system which is virtually free from base line drift, over periods of weeks or even months, and which can be zeroed readily. A further object is to provide a system which delivers an output that is linear with molecular weight. Yet another object is to provide a system which has no moving parts. Still another object is to provide a system which is extremely easy to zero in. An overall object is to provide a molecular weight detector suitable for closed-loop process control. These and other objects will become apparent from the ensuing description of the invention.

Briefly, in accordance with the invention, I provide a gas molecular weight determining system wherein the density of a sample gas is balanced against the density of a reference gas of known molecular weight, both of which are supplied at equal temperature, pressure, and flowrate.

The system makes use of a type of gas density balance apparatus recently invented by me, embodying twin temperature sensitive electrically heated resistance elements as flow detectors in a flowing reference gas stream, the stream being split into two streams, each of which passes over one of the twin detectors. The sample gas stream is introduced into the apparatus downstream of the twin detectors, and when such sample stream has a density (proportional to molecular weight) greater than that of the reference gas, flow tends downward with the result that the reference gas is diverted and the flow over one detector is reduced while the flow over the other is increased. This cools the latter detector at a greater rate and permits the other detector to increase in temperature (because of slower dissipation of heat therefrom), causing an imbalance in an electrical bridge circuit including the twin detectors. The resulting net change in the electrical resistances of the detectors is then measured as an indication of the molecular weight of the gas sample. In such a system not only is all the diverted gas utilized for detections but the two-fold action of cooling one detector and heating the other contributes to the increased sensitivity without being adversely affected by rates of flow.

Means are provided for establishing equal flowrates of reference and sample gas to the gas density balance apparatus. These flows, which are also held at constant temperature, insure the maintenance of high sensitivity and accuracy and freedom from base line drift.

Further details and advantages of the described system will be discussed by reference to the accompanying drawings wherein.

Figure 1:
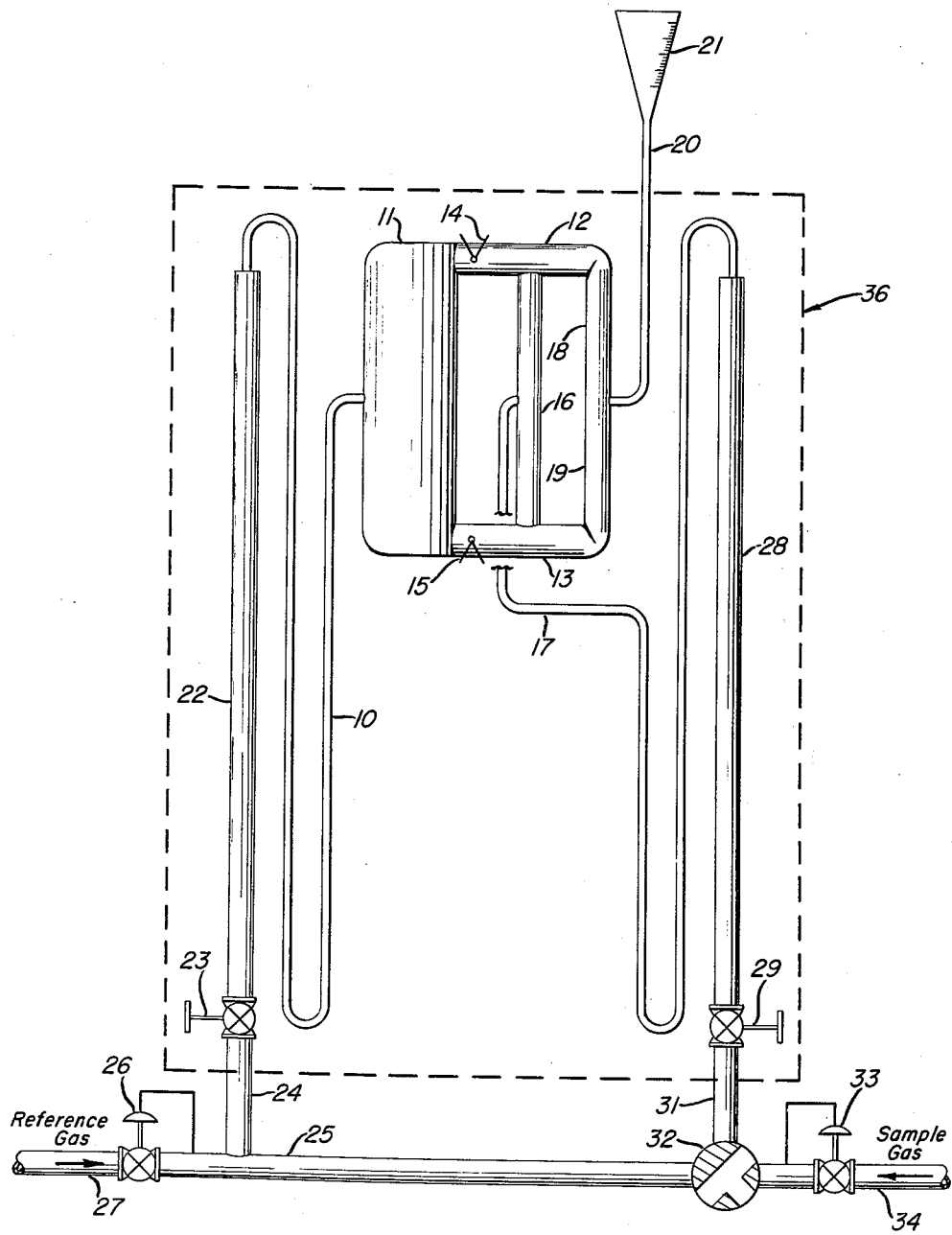
FIGURE 1 is a schematic elevation of an apparatus for continuously determining the molecular weight of a gas and which is constructed in accordance with the invention.

Referring to FIGURE 1, the reference gas is introduced to the gas density balance by reference gas inlet tube 10 into the mid-point of reference gas manifold chamber 11. The flow of reference gas from the reference gas manifold chamber 11 is divided between top detector tube 12 and bottom detector tube 13. Detector filaments 14 and 15 are disposed in detector tubes 12 and 13, respectively. The sample tube 16 extends between the top detector tube 12 and the bottom detector tube 13 and is provided with sample inlet 17.

When a gas sample entering sample tube 16 has a density greater than that of the reference gas flowing through the balance, the flow in sample tube 16 tends downward. This decreases flow across the bottom detector tube 13 and increases flow across the top detector tube 12. This results in a net change in the resistances of the hot wire filaments 14 and 15 which change is measured as an indication of the molecular weight or density of the gas sample introduced into the balance.

The reference gas of now differing flow rate passes from top detector tube 12 into top outlet tube 18 and from bottom detector tube 13 into bottom outlet tube 19. The combined flow from outlet tubes 18 and 19 emerges from the balance by way of outlet tube 20 which is flow-restrictive.

The sample tube 16 may, if desired, be kept to a small volume to give a fast response. Increasing the height of the sample tube 16 increases the driving force of the differences in density but it also increases friction and volume; increasing the diameter of the sample tube 16 also increases volume but it has the beneficial effect of decreasing friction. It tends to compensate for viscosity whereas the effects of viscosity may otherwise be such as to cause non-linear response.

Reference gas of known molecular weight is introduced into the system via conduit 27 and pressure reducing valve 26; the downstream side of valve 26 is held at essentially constant pressure. The gas then passes through conduit 24, needle valve 23, and a vertical reference tube 22, which may have dimensions of say one foot high by ¼" I.D. and is packed with dry "Cellite" as a heat transfer media. Reference tube 22 is for the purpose of helping to maintain pressure constant, and equilibrating temperatures of sample and reference gas so that equal volumes and hence equal molar amounts of reference and sample gas are being measured. This is necessary in order to get accurate measurements of the molecular weight. From tube 22, the gas flows through an unpacked coiled reference gas inlet line 10 into the gas density balance.

Sample gas, of unknown molecular weight or composition, enters the system through conduit 34, three-way valve 32, conduit 31, and needle valve 29 into sample tube 28. This tube 28, together with sample gas inlet tube 17, are constructed similarly to tubes 22 and 10. They serve the purpose of equilibrating the temperatures of reference and sample gas.

A flow meter 21, such as Fischer and Portor "Rotometer," may be connected at outlet conduit 20 to measure the flowrate of exhausted gases.

To commence operations of the system, conduit 34 is closed and three-way valve 32 is positioned to stop any gas flow into sample tube 28. Valves 26 and 23 in the reference gas system are adjusted to provide a flow of, say, 160 ml./min. through reference tube 22 into the gas density balance, as indicated by flowmeter 21.

Three-way valve 32 is then repositioned to permit flow of reference gas through conduit 25 into conduit 31 and sample tube 28. Valve 29 is adjusted to obtain a flow of 320 ml./min. at flowmeter 21; this total flow is twice the flow through reference tube 22. At this time, the gas density balance indicators should read a molecular weight equal to that of the reference gas; this is the "zero."

Finally, three-way valve is switched to allow flow of sample gas from conduit 34 into conduit 31 and sample tube 28. Valve 33 is reset to obtain the original 320 ml./min. flow. The gas density balance now reads the molecular weight of the sample gas. It may be rezeroed at any time by switching three-way valve 32 to feed reference gas to both sides of the balance and readjusting valve 29 or valve 33.

The gas density balance and the several tubes are housed within a temperature-controlled cabinet 36 and supported within the cabinet 36 by any suitable means. Suitable temperature control means including heaters, thermostats, and the like can be provided for controlling the temperature of the cabinet 36. However, since such temperature control systems are well known in the art, details are not given here.

Figure 2:
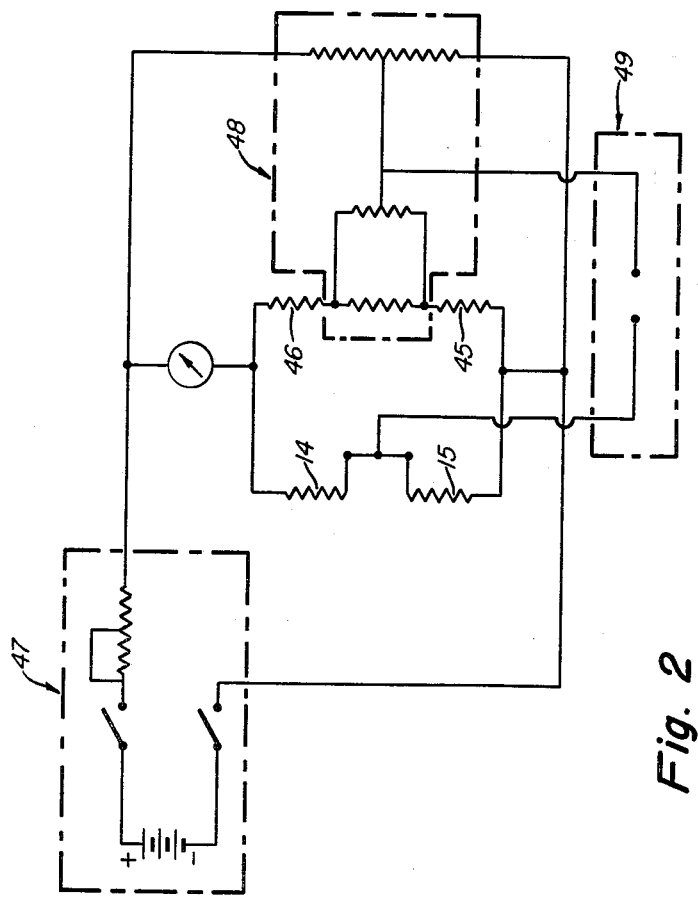
FIGURE 2 is a diagrammatic showing of an electrical bridge circuit including the flow detectors and adapted for use in conjunction with the apparatus of FIGURE 1.

Referring to FIGURE 2, there is shown a Wheatstone bridge circuit with standard resistances 45 and 46 and the detector filaments 14 and 15 comprising hot wire resistance elements. A constant voltage supply 47, a zero adjusting means 48, and an output voltage-responsive means such as recorder 49 or a recorder-controller of suitable type, complete a typical bridge circuit. This general type of bridge circuit and its operation are well known and will not be described in further detail.

The top and bottom detector tubes 12 and 13 contain the hot wire elements 14 and 15, respectively, which are preferably precise lengths of tungsten wire, but it is also contemplated that they may be replaced by thermistors, i.e. an element having negative resistance characteristics in which an increase in temperature of the resistance element decreases resistance. Such a detector element would also increase sensitivity of the balance.

Although the invention has been described with reference to a preferred embodiment thereof, it is to be understood that this is by way of illustration only. Accordingly, it is contemplated that modifications and variations can be made in the apparatus by those skilled in the art in light of the preceding description without departing from the spirit and broad scope of the invention.

I claim:

A method of determining the molecular weight of a sample gas with a gas density balance of the type having a reference gas flow system comprising a pair of vertically displaced reference gas flow conduits and a flow restrictive outlet means from said conduits, a vertically disposed sample gas introduction tube disposed between and in flow communication with said reference gas flow conduits, means for introducing a reference gas of known molecular weight into said reference gas flow system, and detector means in said reference gas flow system for determining changes in rates of flow of reference gas through each of said reference gas flow conduits due to changes in flow of sample gas from said sample gas introduction tube toward one of said conduits, said method comprising: introducing said sample gas and said reference gas into the gas density balance at equal temperature, pressure, and volumetric flow rate, whereby the response of said detector means is a function of the molecular weight difference between said sample gas and said reference gas.

References Cited in the file of this patent

UNITED STATES PATENTS

| | | |
|---|---|---|
| 2,728,219 | Martin | Dec. 27, 1955 |
| 3,002,373 | Kimmell | Oct. 3, 1961 |

OTHER REFERENCES

Vapour Phase Chromatography by Desty, Butterworth Scientific Publications, London, 1957 (pp. 177 and 399). A copy is available in Div. 36.